United States Patent
Itoh

(10) Patent No.: US 12,177,397 B2
(45) Date of Patent: Dec. 24, 2024

(54) IMAGE FORMING APPARATUS TO PERFORM READING OPERATION IN IMAGE SIZE OF IMAGE GREATER THAN SIZE OF SHEET ON WHICH PREDETERMINED PATTERN IS FORMED, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Jun Itoh, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/181,940

(22) Filed: Mar. 10, 2023

(65) Prior Publication Data
US 2023/0300266 A1 Sep. 21, 2023

(30) Foreign Application Priority Data
Mar. 16, 2022 (JP) ................................ 2022-041326

(51) Int. Cl.
H04N 1/23 (2006.01)
H04N 1/00 (2006.01)
H04N 1/405 (2006.01)

(52) U.S. Cl.
CPC ..... *H04N 1/00816* (2013.01); *H04N 1/00045* (2013.01); *H04N 1/00721* (2013.01); *H04N 1/00801* (2013.01); *H04N 1/00824* (2013.01); *H04N 1/2323* (2013.01); *H04N 1/00135* (2013.01); *H04N 1/00681* (2013.01); *H04N 1/4057* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 9,201,331 | B2* | 12/2015 | Shinohara | G03G 15/0131 |
| 2005/0207740 | A1* | 9/2005 | Fukushima | H04N 1/00087 |
| | | | | 386/230 |
| 2005/0286922 | A1* | 12/2005 | Oki | H04N 1/047 |
| | | | | 399/75 |
| 2016/0150117 | A1* | 5/2016 | Furuta | G06K 15/14 |
| | | | | 399/45 |
| 2016/0162762 | A1* | 6/2016 | Maeda | H04N 1/00708 |
| | | | | 358/1.18 |
| 2017/0050812 | A1* | 2/2017 | Mukai | H04N 1/00602 |
| 2019/0071274 | A1* | 3/2019 | Tanigawa | G03G 15/0849 |

FOREIGN PATENT DOCUMENTS

JP 2016111628 A 6/2016

* cited by examiner

*Primary Examiner* — Haris Sabah
(74) *Attorney, Agent, or Firm* — Canon U.S.A., Inc. IP Division

(57) ABSTRACT

An image forming apparatus that reads a print position adjustment chart using an auto document feeder (ADF) and specifies an appropriate image reading size to include paper edges of the chart is provided.

14 Claims, 14 Drawing Sheets

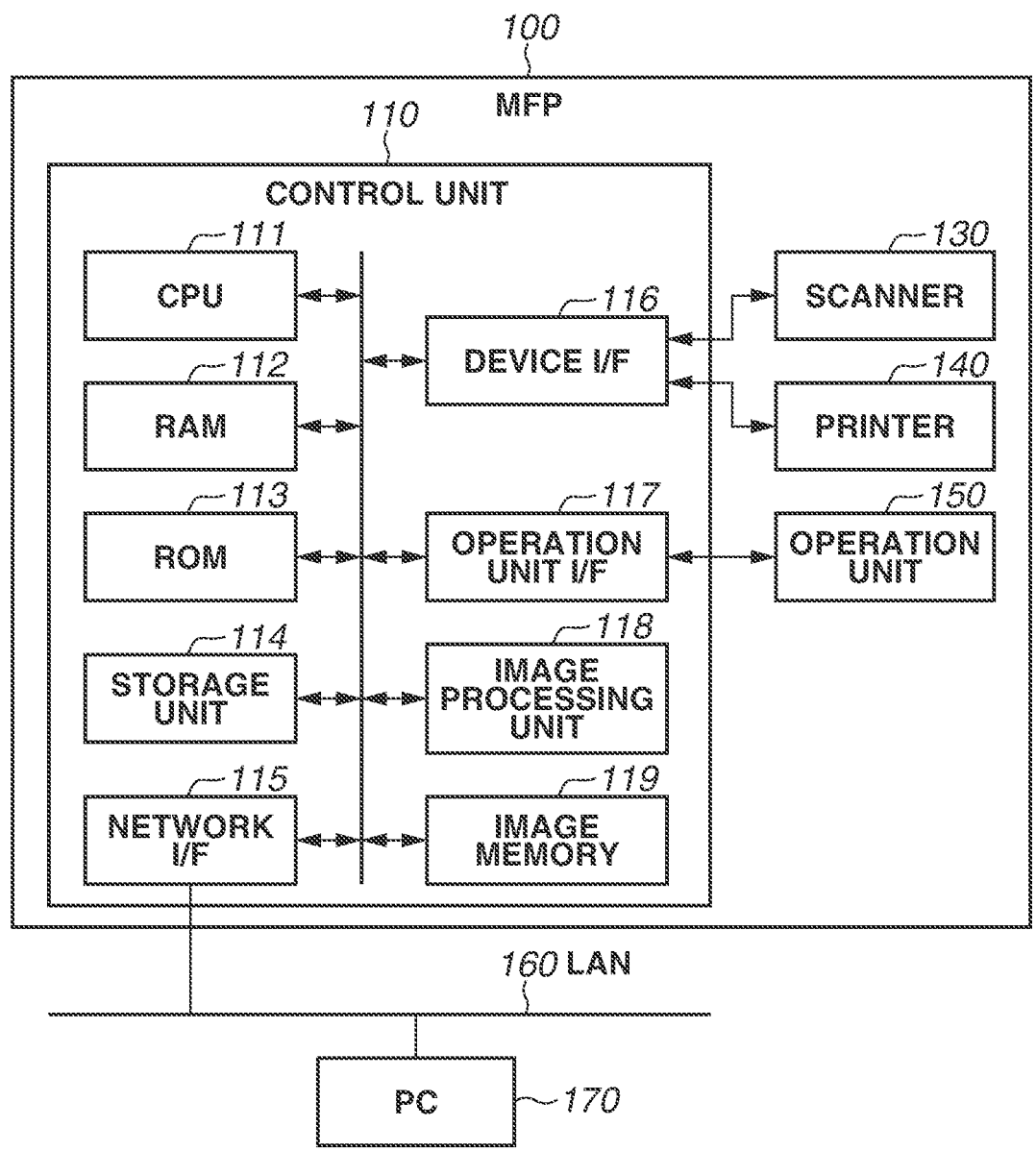

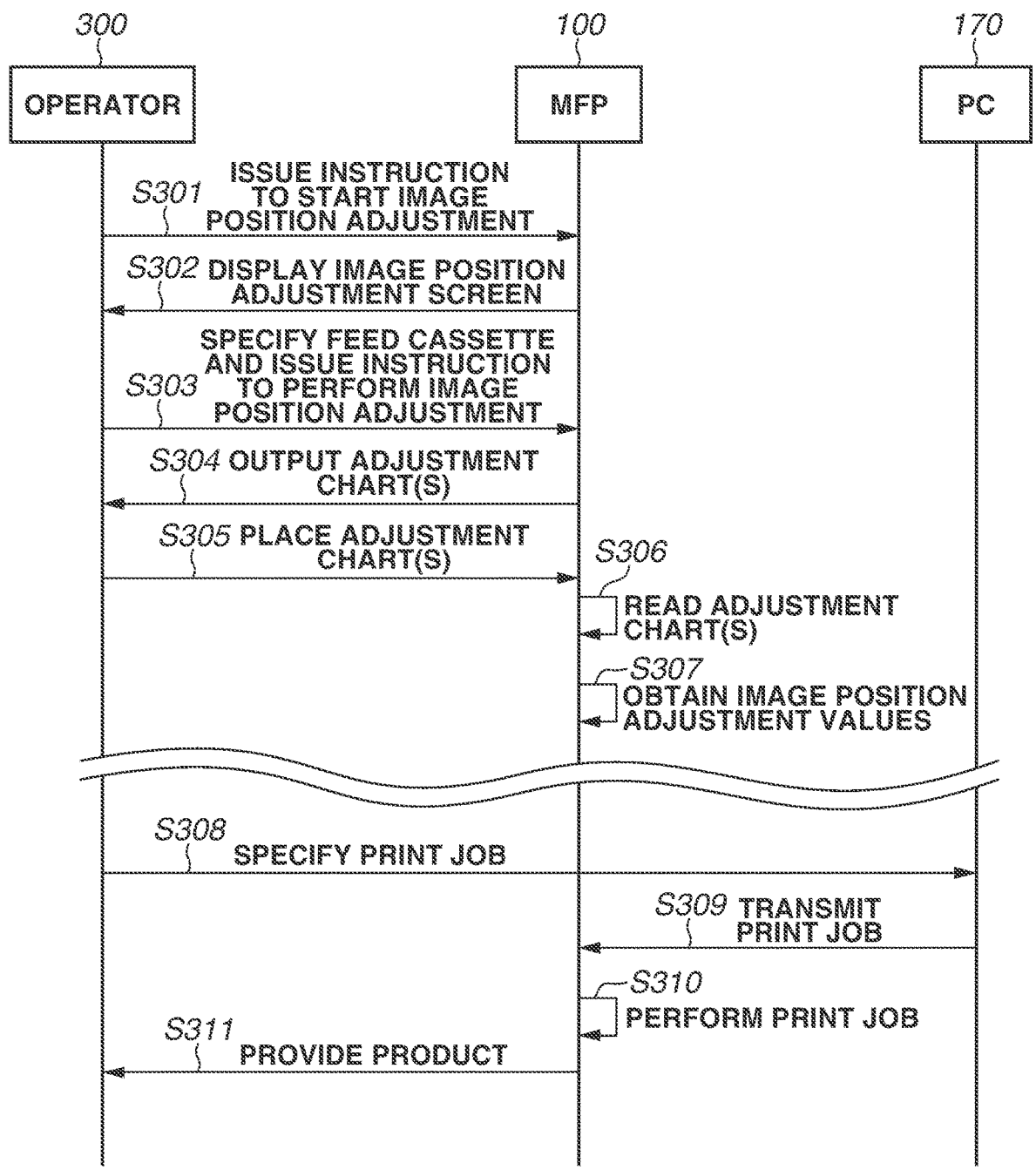

SELECT SHEET CASSETTE IN WHICH TYPE OF SHEETS TO BE CORRECTED ARE LOADED.

404

MANUAL: EMPTY | 1: A4 — 408

2: A3 — 409

3: A3

410 — START PRINTING

SET NUMBER OF TEST PAGES TO BE OUTPUT.

411

412

− | 5 | +

OK

READ PRINTED TEST PAGE(S) USING FEEDER.

401

402

403 START READING

SET TEST PAGE(S) IN ORIENTATION SHOWN ABOVE

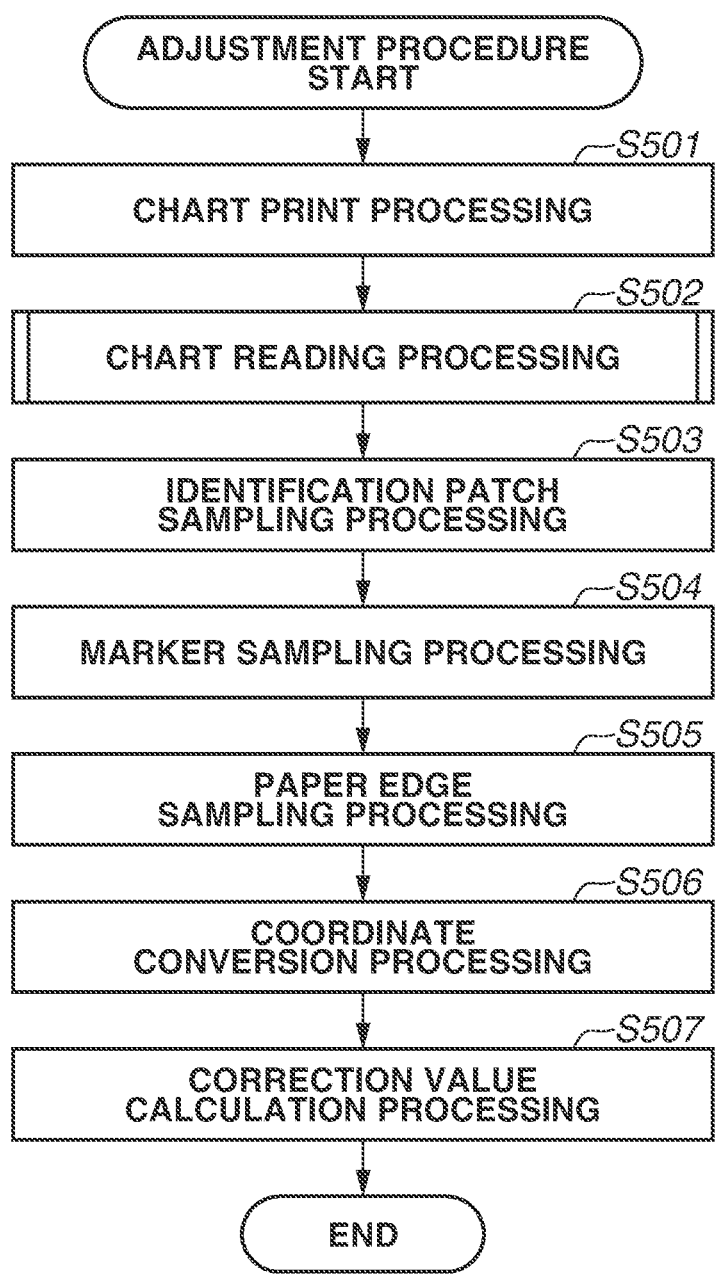

IMAGE FORMING APPARATUS TO PERFORM READING OPERATION IN IMAGE SIZE OF IMAGE GREATER THAN SIZE OF SHEET ON WHICH PREDETERMINED PATTERN IS FORMED, CONTROL METHOD THEREOF, AND NON-TRANSITORY COMPUTER-READABLE STORAGE MEDIUM

BACKGROUND

Technical Field

One disclosed aspect of the embodiments relates to an image forming apparatus, a control method thereof, and a storage medium. This image forming apparatus is applicable to various apparatuses including a copying machine, a printer, a facsimile (FAX) machine, and a multifunction peripheral combining these.

Description of the Related Art

Printing apparatuses (image forming apparatuses) for forming an image on a sheet have conventionally used a function of adjusting the forming position of the image with respect to the sheet (hereinafter, referred to as "print position adjustment"). Japanese Patent Application Laid-Open No. 2016-111628 discusses a technique for obtaining print position adjustment parameters by printing adjustment marks on a sheet, reading the sheet using a reading device, and obtaining a positional relationship between the marks and paper edges. Japanese Patent Application Laid-Open No. 2016-111628 also discusses an automatic sheet feeding device or automatic document feeding device called auto document feeder (ADF) as an example of the reading device. The print position adjustment parameters are affected by the cut shapes of respective cut sheets. The operation for obtaining the print position adjustment parameters is therefore performed for each sheet type.

In the print position adjustment, to obtain the positional relationship between the marks and the paper edges, the image read from the ADF desirably includes the paper edges of the sheet. Since the ADF reads the image while conveying the sheet, if the conveyed sheet skews, some of the paper edges can fail to be included depending on the specification of the image reading size. The image reading size is therefore desirably appropriately specified.

SUMMARY

According to an aspect of the embodiments, an image forming apparatus includes an image forming unit, a reading unit, a control unit, a reading control unit, and an obtaining unit. The image forming unit is configured to form an image on a sheet. The reading unit is configured to convey the sheet and read the image. The control unit is configured to cause the image forming unit to perform image formation processing for forming an image of a predetermined pattern on a sheet. The reading control unit is configured to cause the reading unit to read the sheet on which the image of the predetermined pattern is formed. The obtaining unit is configured to obtain an adjustment value for use in further image formation processing based on a result of the reading. The reading control unit is configured to instruct the reading unit to perform the reading in an image size greater than a size of the sheet on which the image of the predetermined pattern is formed.

Further features of the disclosure will become apparent from the following description of exemplary embodiments with reference to the attached drawings.

BRIEF DESCRIPTION OF THE DRAWINGS

FIG. 1A is a block diagram illustrating a configuration of a multifunction peripheral (MFP).

FIG. 3 is a diagram illustrating a use sequence of print position adjustment.

FIG. 5 is a flowchart of print position adjustment processing.

DESCRIPTION OF THE EMBODIMENTS

Figure 1B:
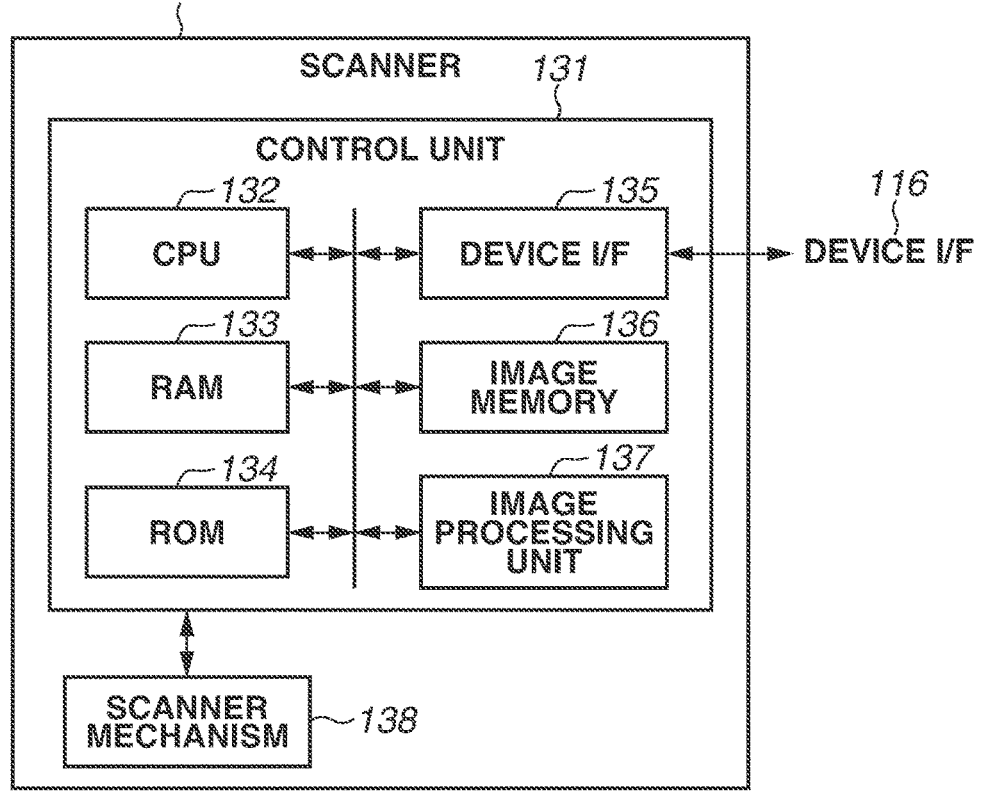
FIG. 1B is a block diagram illustrating a configuration of a scanner.

Exemplary embodiments of the disclosure will be described in detail below with reference to the drawings. The following exemplary embodiments are not intended to limit the disclosure set forth in the claims, and all combinations of the configurations and operations described in the exemplary embodiments are not necessarily indispensable to the solving means of the disclosure. Some or all of the configurations and operations described in the exemplary embodiments may be replaced with equivalents. Some of the configurations and operations may be omitted. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials. Furthermore, depending on the context, the term "portion," "part," "device," "switch," or similar terms may refer to a circuit or a group of circuits. The circuit or group of circuits may include electronic, mechanical, or optical elements such as capacitors, diodes, transistors. For example, a switch is a circuit that turns on and turns off a connection. It can be implemented by a transistor circuit or similar electronic devices. Other terms connoting similar meanings as "unit" are section, module, function, etc.

A first exemplary embodiment will be described by using as an example an image forming apparatus that obtains image position (print position) adjustment values by printing an adjustment chart (correction chart, print position adjustment chart) on a sheet and reading the adjustment chart using an auto document feeder (ADF) (reading unit). In particular, in the present exemplary embodiment, chart reading processing will be described in detail.

FIG. 3 is a sequence diagram illustrating a use example of the present system. In the present exemplary embodiment, main transactions are made between an operator 300 and a multifunction peripheral (MFP) 100. Here, processing starting with a cassette library edit screen displayed will be described.

In operation S301, the operator 300 issues an instruction to start image position adjustment.

In operation S302, the MFP 100 determines to start the image position adjustment, and displays an image position adjustment screen.

In operation S303, the operator 300 observing the image position adjustment screen specifies a feed cassette to adjust, sets a method for performing the image position adjustment, and issues an instruction to perform the image position adjustment. The MFP 100 starts image position adjustment processing based on the instruction.

In operation S304, the MFP 100 outputs an adjustment chart or charts. The output adjustment charts (output products) are stacked on a sheet discharge unit of the MFP 100. The number of adjustment charts to be output here may be one or more. The number of adjustment charts to be output may be set in advance or specified by the operator 300. With the adjustment chart(s) output, the MFP 100 displays an adjustment chart reading screen.

In operation S305, the operator 300 places the output adjustment chart(s) on a placement unit 231 of an ADF unit 230 (document reading unit) based on notifications on the adjustment chart reading screen, and issues an instruction to start reading.

In operation S306, the MFP 100 performs processing for reading the adjustment chart(s) placed on the document reading unit.

In operation S307, the MFP 100 obtains image position adjustment values (parameters, print position deviation amounts) based on the image(s) read from the adjustment chart(s).

In the present exemplary embodiment, the image position adjustment of the feed cassette is performed in such a manner. Using the image position deviation amounts (adjustment values) registered for each feed cassette, image formation is then performed as described below.

In operation S308, the operator 300 specifies and sets a print job for the MFP 100 to output and issues an instruction to perform the print job using a host computer (personal computer [PC] 170). For example, the operator 300 sets a print job to perform printing using sheets in a specific feed cassette, and then issues an instruction to perform the print job.

In operation S309, the host computer transmits the print job specified by the operator 300 to the MFP 100.

In operation S310, the MFP 100 performs the print job using the sheets in the specific feed cassette. Here, the MFP 100 reads the image position deviation amounts registered for the specific feed cassette from a cassette library and applies the image position device amounts in performing the print job.

In operation S311, the MFP 100 provides products adjusted in image position.

As described in conjunction with the foregoing series of processing, in the state where the image position deviation amounts are linked with sheets in a feed cassette by the image position adjustment processing, the MFP 100 makes adjustments using the image position deviation amounts in performing a print job that uses the sheets in the feed cassette. The image position adjustment can thus be easily applied in performing the print job, whereby the operation load of the operator 300 can be reduced.

<MFP>

Next, a configuration of the MFP 100 will be described. FIG. 1A is a block diagram illustrating the configuration of the MFP 100.

As illustrated in FIG. 1A, the MFP 100 includes a control unit 110, a scanner 130, a printer 140, and an operation unit 150.

The scanner 130 is a reading unit (reading device) for reading an image from a document.

The printer 140 is an image forming unit (image forming device) for forming an image on a sheet.

The operation unit 150 is a user interface (operation panel) for outputting information to the operator 300 and accepting instructions from the operator 300. The operation unit 150 includes a display (display unit) and a speaker as components for outputting information. The operation unit 150 includes a touchscreen and hardware keys as components for inputting information.

The control unit 110 is a controller for controlling the components of the MFP 100 in a centralized manner. The control unit 110 is connected to the scanner 130 and the printer 140, and controls input and output of image information. The control unit 110 includes a central processing unit (CPU) 111, a random access memory (RAM) 112, and a read-only memory (ROM) 113 as a minimum configuration of the controller. The control unit 110 also includes a storage unit 114, a network interface (I/F) 115, a device I/F 116, an operation unit I/F 117, an image processing unit 118, and an image memory 119. Such components are connected by a communication unit such as a bus.

The CPU 111 is a general-purpose processor for performing various types of calculation processing.

The RAM 112 is a volatile memory functioning as a working memory of the CPU 111.

The ROM 113 is a nonvolatile memory and stores various programs including a system boot program.

The storage unit 114 is a storage storing information. For example, a hard disk drive (HDD) or a solid state drive (SSD) is used as the storage unit 114. The storage unit 114 stores system software, image data, and programs for controlling operation of the MFP 100.

The programs stored in the storage unit 114 are loaded into the RAM 112. The CPU 111 controls the operation of the MFP 100 based on the programs loaded into the RAM 112.

The network I/F 115 is a communication I/F for connecting to a network. The network I/F 115 connects to a local area network (LAN) 160 and thereby controls input and output of various types of information via the network. The network I/F 115 may be any interface capable of wired communication, wireless communication, or both.

The device I/F 116 connects the scanner 130 and the printer 140, or image input and output devices, to the control unit 110, and converts between synchronous and asynchronous image data.

The operation unit I/F 117 is an I/F for connecting the operation unit 150 to the control unit 110. The operation unit I/F 117 outputs output information, such as image data, to display information on the display of the operation unit 150. The operation unit I/F 117 transmits input information input by the user (operator) using the operation unit 150 to the CPU 111.

The image processing unit 118 is a processor or a group of circuits specialized in image processing. The image processing unit 118 performs image processing on print data received via the LAN 160. The image processing unit 118 also performs image processing on image data input and output via the device I/F 116.

The image memory 119 is a memory for temporarily loading image data to be processed by the image processing unit 118.

Sheets for the MFP 100 to use in printing are managed by the operator 300 using a database called cassette library. The cassette library is stored in the storage unit 114 or the RAM 112, and read and written as appropriate by various software modules. Since the cassette library is a conventional configuration, a detailed description thereof will be omitted.

<Scanner>

Figure 2:
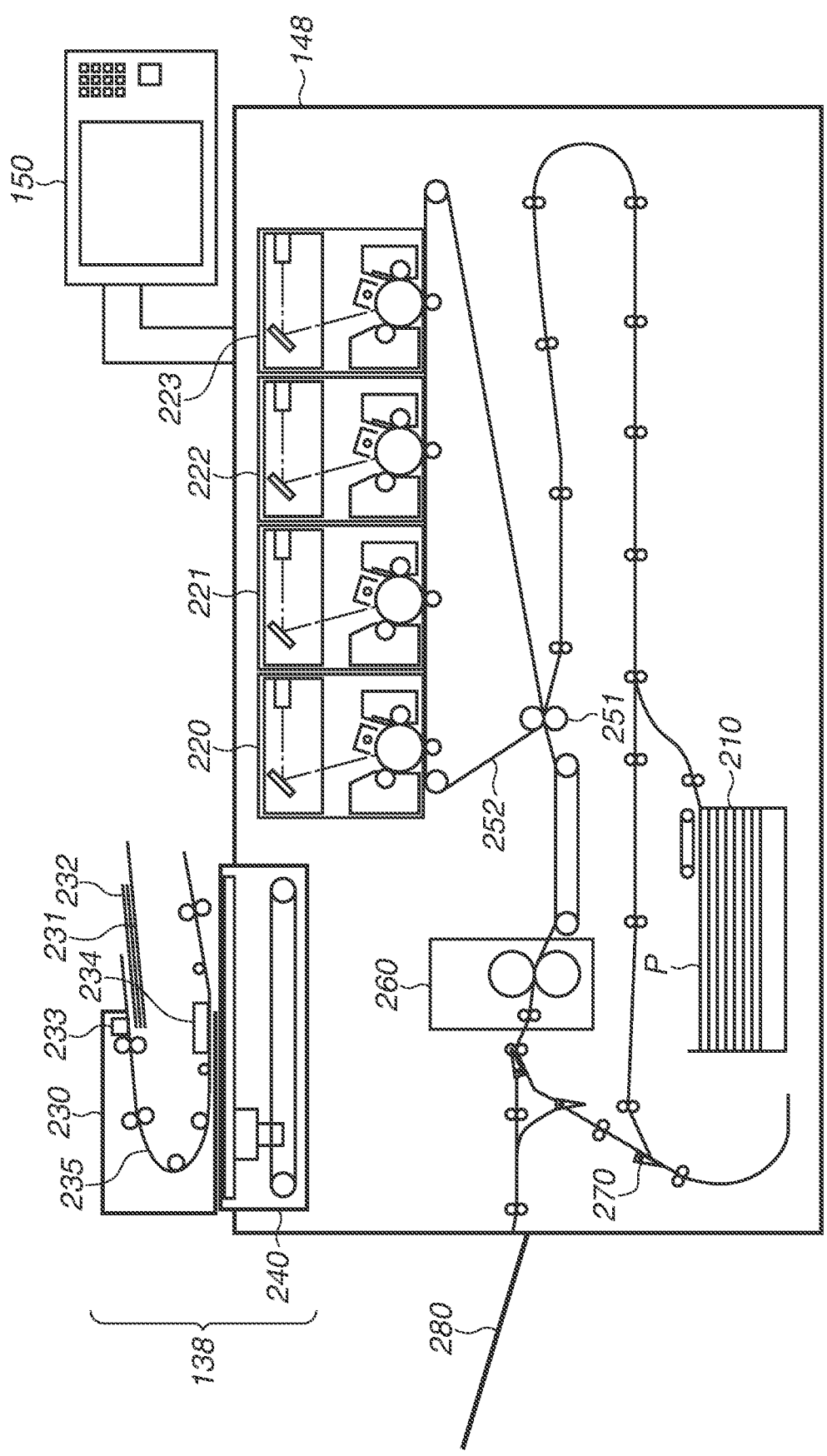
FIG. 2 is a diagram illustrating a detailed configuration of the MFP.

FIG. 1B is a block diagram illustrating a configuration of the scanner 130. FIG. 2 is a diagram illustrating a detailed configuration of the MFP 100. The scanner 130 includes a control unit 131 and a scanner mechanism 138. The control unit 131 includes a CPU 132, a RAM 133, a ROM 134, a device I/F 135, an image memory 136, and an image processing unit 137.

The CPU 132 controls operation of the scanner 130. The CPU 132 operates based on programs stored in the ROM 134 and loaded into the RAM 133. The device I/F 135 connects to the control unit 110 and converts between synchronous and asynchronous image data. The image memory 136 is a memory for temporarily loading image data input from the scanner mechanism 138. The control unit 131 transmits the image data stored in the image memory 136 to the control unit 110 based on an image transfer command received via the device I/F 135.

The image processing unit 137 performs image processing on the image data loaded into the image memory 136.

The scanner mechanism 138 includes a document platen 240 for reading a document placed on a glass plate, and the ADF unit 230 that conveys a document 232 placed on the placement unit 231 and reads the document 232. In the ADF unit 230, a document 232 placed on the placement unit 231 and detected by a detection sensor 233 is conveyed by conveyance rollers on a conveyance path 235. An image sensor pair 234 reads images on the front and back of the conveyed document 232. The image sensor pair 234 includes front and back, two line sensors having a longitudinal length in the depth direction of FIG. 2 (the direction orthogonal to the conveyance direction in FIG. 6A, the direction along distance (A) in FIG. 6C). The line sensors are contact image sensors (CISes), for example. The longitudinal length of the image sensor pair 234 is configured to be greater than a maximum document width readable by the ADF unit 230. An image sensor included in the document platen 240 may be diverted to replace the back image sensor of the image sensor pair 234. The image sensor pair 234 reads pixel information for a line from the document 232 at a time using a plurality of sensors arranged in the longitudinal direction. The document image can be read by reading pixel information for a plurality of lines in synchronization with the conveyance of the document.

<Printer>

Figure 1C:
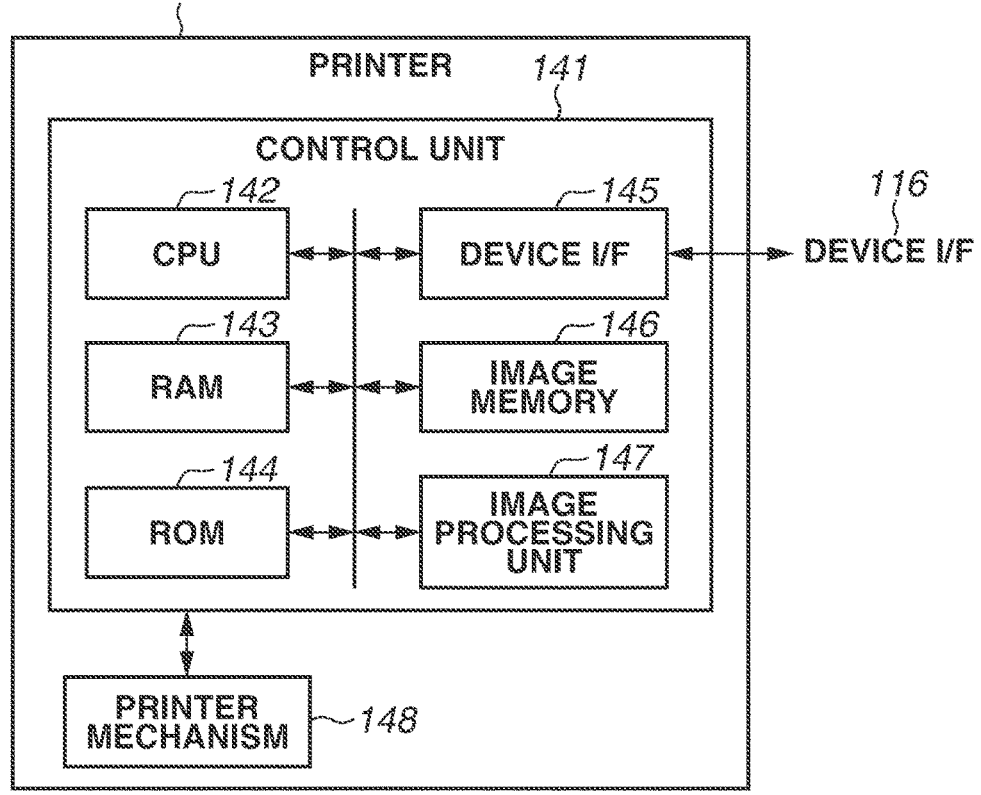
FIG. 1C is a block diagram illustrating a configuration of a printer.

FIG. 1C is a block diagram illustrating a configuration of the printer 140. The printer 140 includes a control unit 141 and a printer mechanism 148. The control unit 141 includes a CPU 142, a RAM 143, a ROM 144, a device I/F 145, an image memory 146, and an image processing unit 147.

The CPU 142 controls operation of the printer 140. The CPU 142 operates based on programs stored in the ROM 144 and loaded into the RAM 143. The device I/F 145 connects to the control unit 110 and converts between synchronous and asynchronous image data. The image memory 146 is a memory for temporarily loading image data input from the control unit 110. The control unit 141 controls the printer mechanism 148 based on commands received via the device I/F 145.

The printer mechanism 148 is a mechanical mechanism for performing electrophotographic image formation processing. The printer mechanism 148 includes an engine control unit for controlling print processes (for example, sheet feed processing), and a control board accommodation unit that accommodates the printer control unit 141.

Examples of mechanisms constituting an engine unit include an optical processing mechanism for forming a latent image and developing the latent image into a toner image, a transfer processing mechanism for transferring the toner image to a sheet P, and a fixing processing mechanism for fixing the toner image transferred to the sheet P. Other examples include a feed processing mechanism for feeding the sheet P and a conveyance processing mechanism for conveying the sheet P.

During color image formation, a yellow (Y) station 220, a magenta (M) station 221, a cyan (C) station 222, and a black (K) station 223 are used as optical processing mechanisms. Toner images developed by the respective stations are transferred to an intermediate transfer member 252 in succession, whereby a full-color visible image is formed on the intermediate transfer member 252 (primary transfer).

Next, a sheet P fed from a sheet container 210 is conveyed and pressed against the intermediate transfer member 252 by a transfer roller 251 while a bias of a polarity opposite to that of the toner is applied to the transfer roller 251. The visible image formed on the intermediate transfer member 252 is thereby transferred to the sheet P synchronously conveyed in the conveyance direction (sub scanning direction) of the sheet P by the feed processing mechanism (secondary transfer).

The secondarily transferred sheet P is passed through a fixing device 260, whereby the toner transferred to the sheet P is heated to melt and fixed to the sheet P as an image. In the case of two-sided printing, the sheet P is passed through a reversing unit 270, switched back and reversed, and guided into the transfer portion again, whereby an image is formed on the back of the sheet P. The sheet P is then passed through the fixing device 260 as described above, whereby the toner image on the sheet P is thermally fixed. The sheet P is discharged to a sheet discharge unit 280 to complete the print processes.

<Image Position Adjustment>

A method for obtaining the image position adjustment values using the adjustment chart(s) will be described in detail.

Figure 6A:
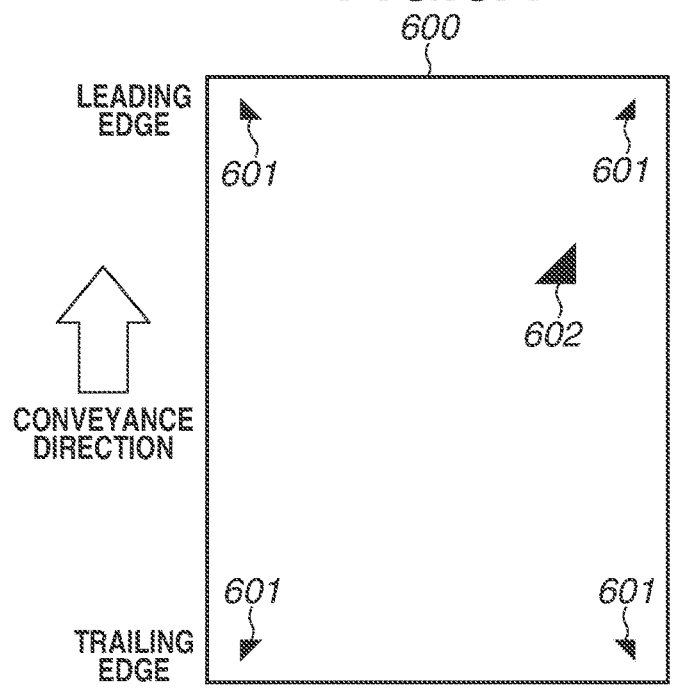
FIG. 6A is a diagram illustrating the front of an adjustment chart.
Figure 6B:
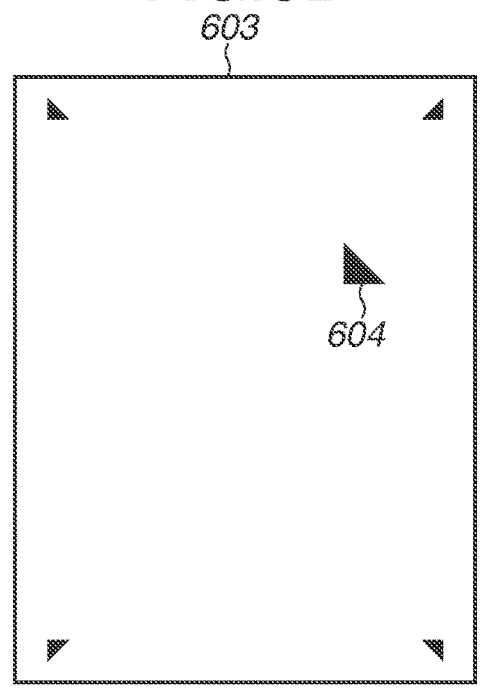
FIG. 6B is a diagram illustrating the back of an adjustment chart.
Figure 6C:
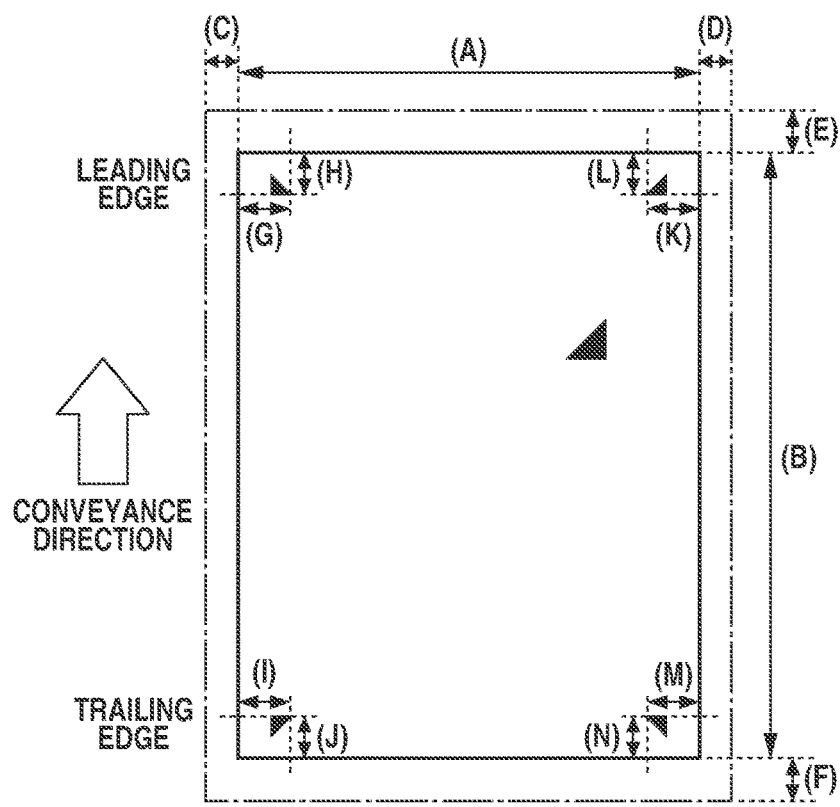
FIG. 6C is a diagram for describing adjustment chart measurement points.

FIG. 6A is a diagram illustrating the front of an adjustment chart. FIG. 6B is a diagram illustrating the back of an adjustment chart. FIG. 6C is a diagram for describing adjustment chart measurement points.

As illustrated in FIG. 6A, a chart that is a sheet on which image position adjustment marks are printed will be described as an example.

A chart 600 includes markers 601 and an identification patch 602 as an image of a predetermined pattern. A chart 603 includes markers 601 and an identification patch 604.

The markers 601 are images for measuring image forming positions on the sheet. The markers 601 are isosceles triangles formed near the four corners of the sheet.

The identification patches 602 and 604 are images for identifying the front and back of the chart and the orientation of the chart.

The identification patch 602 is located closer to the center in term of the short and long sides of the sheet than the markers 601.

Using such charts 601 and 603, the portions represented by distances (A), (B), and (G) to (N) in FIG. 6C are measured. Distances (A) and (B) are the lengths of the chart in the main scanning direction and the sub scanning direction, respectively. The ideal lengths of distances (A) and (B) are sheet lengths defined by the sheet library.

The front and back of the chart and the placement orientation are determined based on the positions and orientation of the identification patches 602 and 604. For example, if an image detected by identification patch sampling processing is the identification patch 602, the side is determined to be the front of the chart. If the image detected by the identification patch sampling processing is the identification patch 604, the side is determined to be the back of the chart. Here, if the identification patch 602 or 604 is located in the upper right area, the placement orientation is determined to be normal. On the other hand, if the identification patch 602 or 604 here is located in the lower left area, the placement orientation is determined to be upside down.

Distances (G) to (H) are the distances from the corners of the markers 601 to the closest sheet ends. The distances measured as illustrated in FIG. 6C are summarized into a table as measurement values, and stored in the RAM 112. The measurement values are used in calculating adjustment values.

To obtain the foregoing adjustment values, the MFP 100 according to the present exemplary embodiment performs a series of processes intended for the adjustment function. FIG. 5 is a flowchart of print position adjustment processing.

In operation S501, the CPU 111 performs chart print processing.

Figures 4A, 4B, 4C:
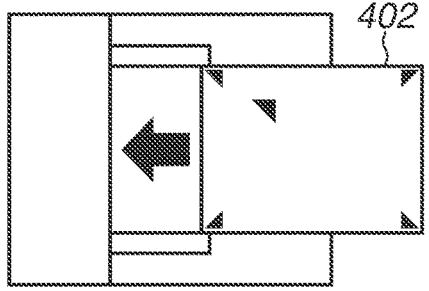
FIG. 4A is a diagram illustrating an image position adjustment screen.
FIG. 4B is a diagram illustrating an output chart number setting screen.
FIG. 4C is a diagram illustrating a chart reading screen.

In a operation of the chart print processing, the CPU 111 displays an image position adjustment screen 404 on the operation unit 150. As illustrated in FIG. 4A, the image position adjustment screen 404 includes a printing start button 410 and a plurality of pieces of cassette information including cassette information 408 and 409. The cassette information 408 represents an example of information about a cassette where the image position adjustment is unable to be started due to a reason such as the absence of sheets. The cassette information 409 represents an example of information about a cassette where the image position adjustment can be started. The pieces of cassette information are thus desirably displayed in different modes depending on whether a condition on which the image position adjustment can be started is satisfied. The user specifies the information about the cassette to perform the image position adjustment from the plurality of pieces of cassette information, and selects the printing start button 410.

The CPU 111 accepting this instruction causes the printer 140 to perform image formation on a predetermined number of sheets based on the adjustment chart images. A predetermined number of charts illustrated in FIGS. 6A and 6B are thereby output to the chart discharge unit 280. The number of charts to be output for a single image position adjustment may be changeable based on the user's instructions.

For example, as illustrated in FIG. 4B, the CPU 111 displays an output chart number setting screen 411 on the operation unit 150. The output chart number setting screen 411 includes an input form 412 for inputting the setting value of the number of charts to be output, and an OK button. If the number of charts to be output is input in the input form 412 and then the OK button is selected, the CPU 111 stores the number set in the input form 412 into the RAM 112. The information is used when the printing start button 410 is selected.

In operation S502, the CPU 111 performs chart reading processing.

In a operation of the chart reading processing, the CPU 111 displays a chart reading screen 401 on the operation unit 150. As illustrated in FIG. 4C, the chart reading screen 401 includes guidance information 402 indicating the reading orientation of the chart(s), and a reading start button 403. If the reading start button 403 is selected with a chart or charts set on the placement unit 231, the CPU 111 starts reading processing.

In operation S503, the CPU 111 performs the identification patch sampling processing.

In the identification patch sampling processing, the CPU 111 performs processing for identifying the front, back, and orientation of the chart(s).

In operation S504, the CPU 111 performs marker sampling processing.

In the marker sampling processing, the CPU 111 performs processing for measuring the image forming positions on the chart(s).

In operation S505, the CPU 111 performs paper edge sampling processing.

In the paper edge sampling processing, the CPU 111 performs processing for detecting the positions of the paper edges, or the positions of the corners of the sheet(s) in particular. Examples of the paper edge detection method include a method for detecting the shadows of the paper edges and a method for detecting color differences from the areas outside the sheet(s). A description of such conventional techniques will be omitted in the present exemplary embodiment.

In operation S506, the CPU 111 performs coordinate conversion processing.

In the coordinate conversion processing, the CPU 111 calculates the measurement values of the distances based on coordinate information about the markers obtained in operation S504 and coordinate information about the paper edges obtained in operation S505. The CPU 111 also performs correction processing on the coordinate information as appropriate in calculating the measurement values.

In operation S507, the CPU 111 performs correction value calculation processing. In operation S507, the CPU 111 calculates correction values (adjustment values) based on the information obtained by the processing so far.

If the calculation of the correction values is normally completed, the CPU 111 issues a notification of the completion of correction.

<Image Reading Processing>

Image reading processing will be described. In the present exemplary embodiment, an image is read from a area wider than the document size so that sheet edges can be appropriately detected in reading a chart. In FIG. 6C, distances (C) to (F) represent the lengths of margin areas for reading an image including the sheet edges in reading a chart. Distance (C) represents the length of the margin area at the leading edge of the chart in the main scanning direction, and distance (D) the length of the margin area at the trailing edge in the main scanning direction. Distance (E) represents the length of the margin area at the leading edge of the chart in the sub scanning direction, and distance (F) the length of the margin area at the trailing edge in the sub scanning direction. The margin areas are added to enable the reading of the image including the paper edges (sheet edges) even if the chart is conveyed askew when the scanner 130 reads the chart using the ADF unit 230. The lengths of distances (C) to (F) can therefore be defined based on the conveyance performance of the scanner 130. For example, distances (C) to (F) all may be the same or different in length.

Distances (C) to (F) during chart reading processing and normal reading processing will be described in a comparative manner with reference to FIGS. 7 to 10.

<Reading Control in Sub Scanning Direction>

Differences in control in the sub scanning direction of a sheet between during the chart reading processing and during the normal reading processing will initially be described with reference to FIGS. 7 and 8.

Figure 7:
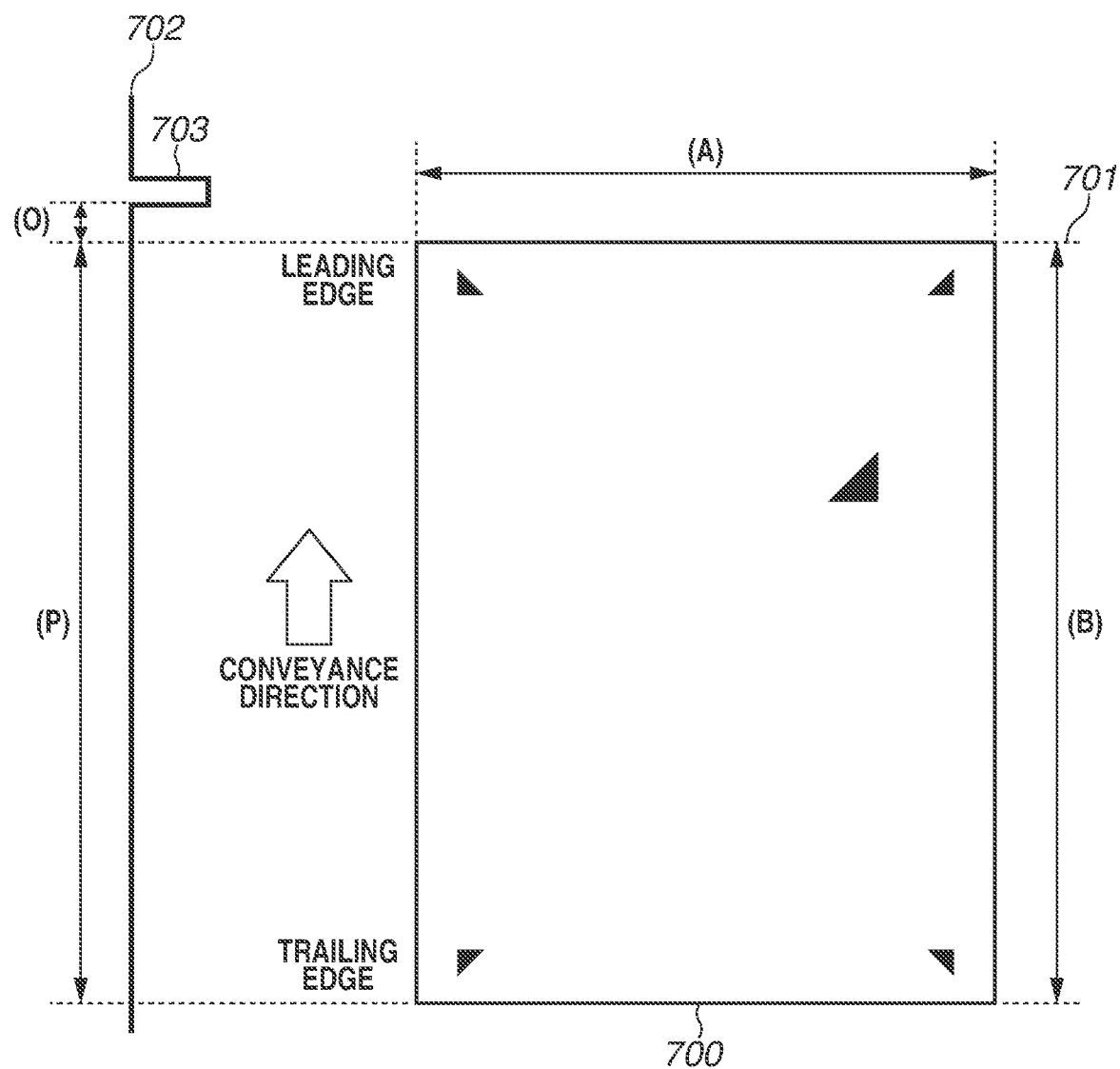
FIG. 7 is a diagram illustrating the reading size of a normal document in a sub scanning direction.

FIG. 7 is a diagram for describing the reading size in the sub scanning direction in performing the normal reading processing. FIG. 7 schematically illustrates a relationship between the read image and a synchronization signal.

In FIG. 7, a sheet 700 represents the sheet for the scanner 130 to read. Distances (A) and (B) represent the lengths of the sheet to be read in the main scanning direction and the sub scanning direction, respectively.

A synchronization signal 702 is a synchronization signal used for control where the CPU 111 receives the image read by the scanner 130 via the device I/F 116.

A timing waveform 703 indicates the timing of the synchronization signal 702 when the CPU 111 controls start of reception of the read image from the scanner 130 via the device I/F 116. The timing waveform 703 indicates the timing in terms of the length in the sub scanning direction. The scanner 130 starts to transmit the read image to the device I/F 116 after a lapse of a predetermined time-lag time (time to convey the sheet by distance (O)) from the timing waveform 703. The CPU 111 receives the transmitted read image. Specifically, the CPU 111 receives the read image from the scanner 130 via the device I/F 116 for distance (P) corresponding to distance (B) that is the length of the sheet in the sub scanning direction after an interval of distance (O) from the timing waveform 703. To receive the image for distance (P), the CPU 111 specifies distance (B) that is the length of the sheet in the sub scanning direction as the reading size in the sub scanning direction in advance, and then instructs the scanner 130 to start reading. When the reading for the length of distance (B) that is the specified reading size in the sub scanning direction is completed, the sensor reading is stopped.

By thus controlling the image read timing, an image as much as distance (B) from a leading edge 701 of the sheet 700 can be read. In other words, an image having exactly the same size as the document can be read.

By contrast to such normal reading processing, the processing for reading a print position adjustment chart includes image read timing control in consideration of the margins in the sub scanning direction.

Figure 8:
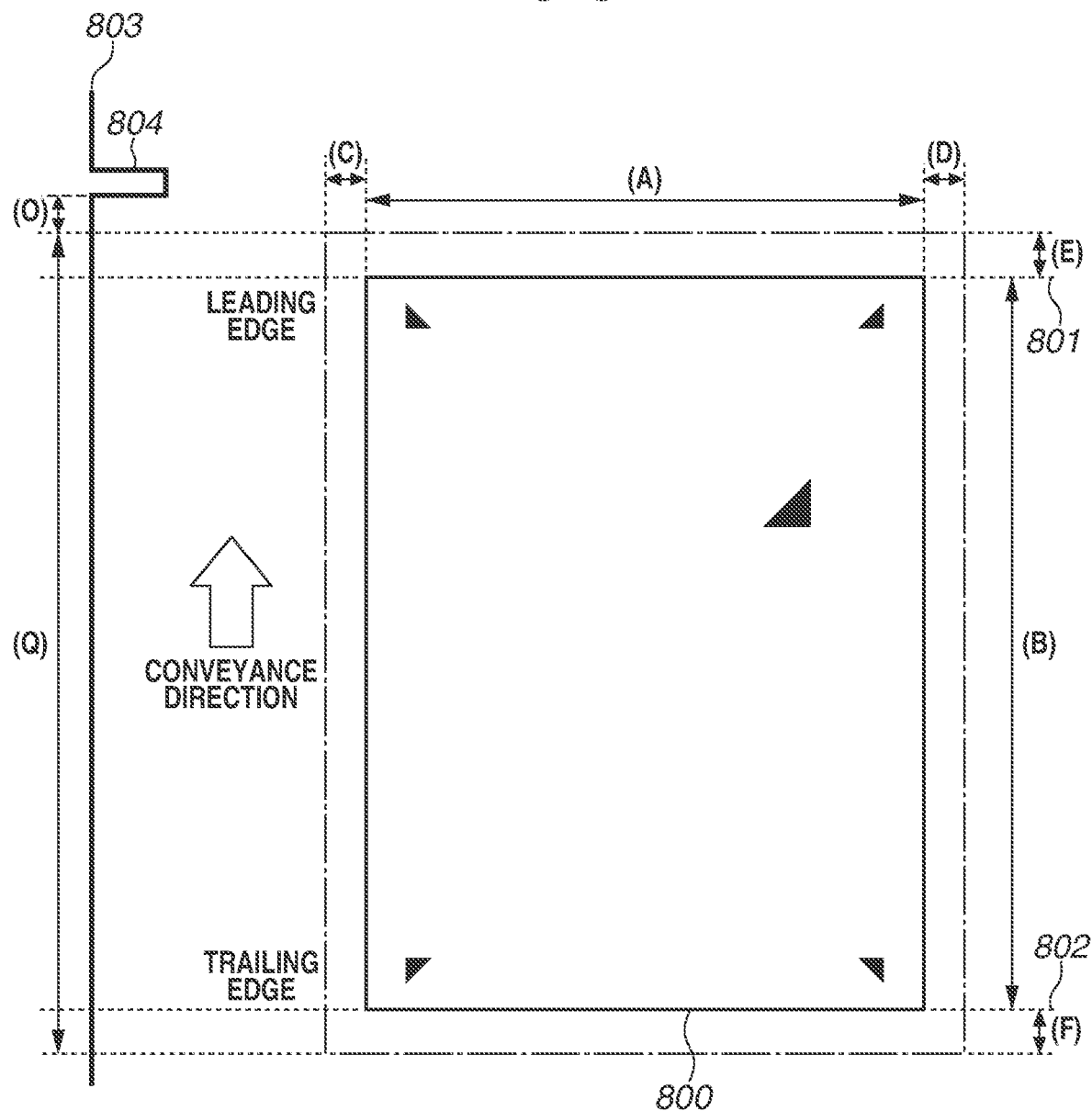
FIG. 8 is a diagram illustrating the reading size of a correction chart in the sub scanning direction.

FIG. 8 is a diagram for describing the reading size in the sub scanning direction in reading the print position adjustment chart. FIG. 8 schematically illustrates a relationship between the read image and a synchronization signal.

In FIG. 8, a sheet 800 represents the print position adjustment chart for the scanner 130 to read. Distances (A) and (B) represent the lengths of the print position adjustment chart in the main scanning direction and the sub scanning direction, respectively. Distances (C) to (F) represent the lengths of the margin areas for reading an image including the paper edges of the print position adjustment chart from the scanner 130.

A synchronization signal 803 is a synchronization signal used for control where the CPU 111 receives the image read by the scanner 130 via the device I/F 116.

A timing waveform 804 indicates the timing of the synchronization signal 803 when the CPU 111 starts to receive the read image from the scanner 130 via the device I/F 116. The timing waveform 804 indicates the timing in terms of the length in the sub scanning direction. The scanner 130 starts to transmit the read image to the device I/F 116 after a lapse of a predetermined time-lag time (time to convey the sheet by distance (O)) from the timing waveform 804, and the CPU 111 receives the transmitted read image. Specifically, the CPU 111 receives the read image from the scanner 130 via the device I/F 116 after an interval of distance (O) from the timing waveform 804. The read image here has a length as much as distance (Q) corresponding to distance (B) that is the length of the sheet in the sub scanning direction+distance (E) of the margin area+distance (F) of the margin area. To receive the image for distance (Q), the CPU 111 specifies the reading size in the sub scanning direction in advance, and then instructs the scanner 130 to start reading. The length in the sub scanning direction is distance (B)+distance (E) of the margin area+distance (F) of the margin area.

By thus adjusting the timing waveform 804 of the synchronization signal 803 to control the image read timing, the reading of the image of the margin area of distance (E) at the leading edge in the sub scanning direction can be started before a leading edge 801 of the print position adjustment chart in the sub scanning direction reaches the image sensor pair 234. The leading edge 801 then reaches the image sensor pair 234, and the print position adjustment chart is read. After the image as much as distance (B) in the sub scanning direction of the print position adjustment chart is read, the image of the margin area of distance (F) at the trailing edge in the sub scanning direction is also read. When the reading of the image as much as distance (F) from a trailing edge 802 of the print position adjustment chart is completed, the sensor reading is stopped.

As described above with reference to FIGS. 7 and 8, in the processing for reading the print position adjustment chart, the image read timing in the sub scanning direction is controlled to come earlier than in the normal reading processing. Specifically, the timing to start image reading after the document placed on the placement unit 231 starts to be conveyed is controlled to come distance (E) earlier than in the normal reading processing.

<Reading Control in Main Scanning Direction>

Next, differences in control in the main scanning direction of a sheet between during the chart reading processing and during the normal reading processing will be described with reference to FIGS. 9 and 10.

Figure 9:
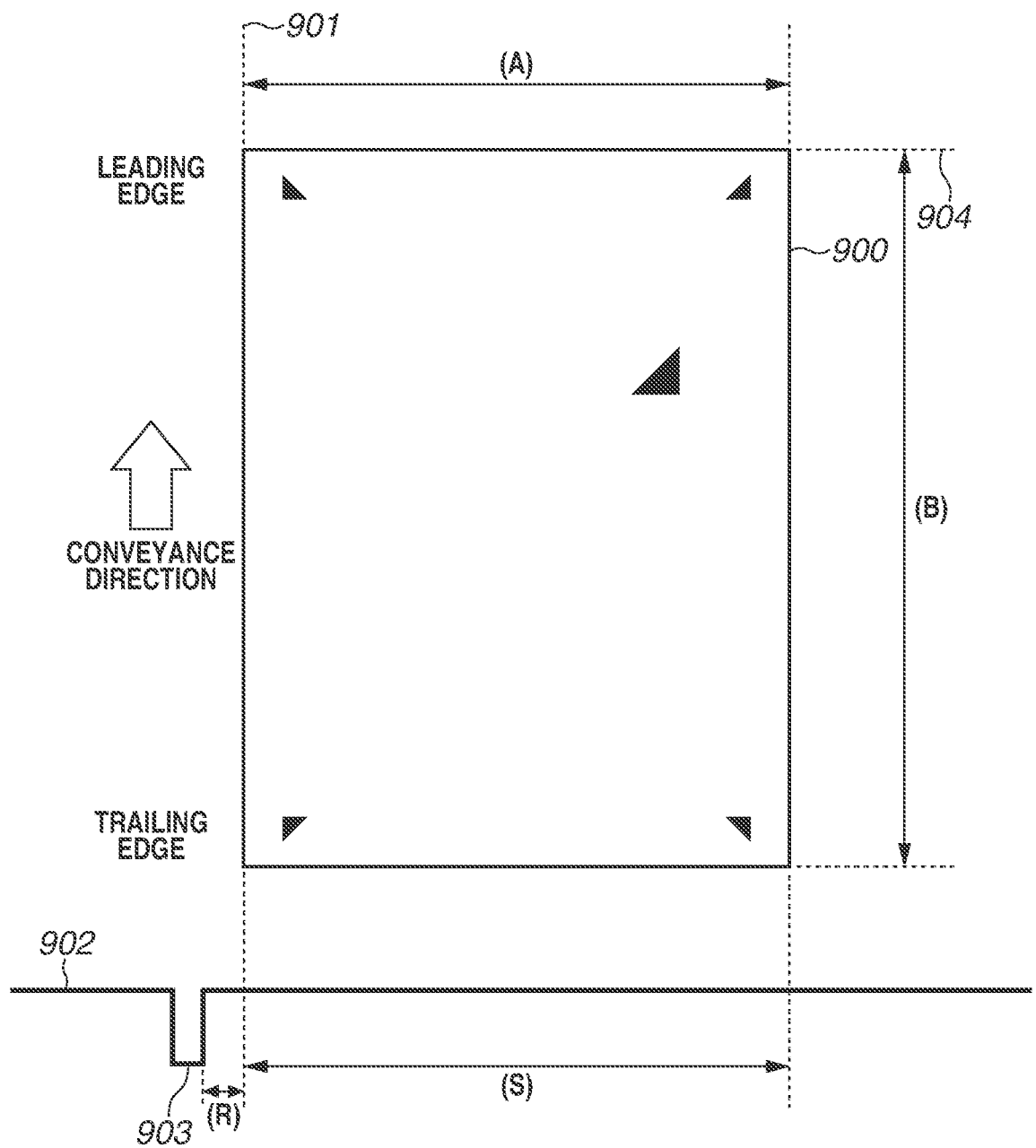
FIG. 9 is a diagram illustrating the reading size of the normal document in a main scanning direction.

FIG. 9 is a diagram for describing the reading size in the main scanning direction in performing the normal reading processing. FIG. 9 schematically illustrates a relationship between the read image and a synchronization signal.

In FIG. 9, a sheet 900 represents the sheet for the scanner 130 to read. Distances (A) and (B) represent the lengths of the sheet to be read in the main scanning direction and the sub scanning direction, respectively. A synchronization signal 902 is a synchronization signal used for control where the CPU 111 receives the image read by the scanner 130 via the device I/F 116. A timing waveform 903 is a synchronization signal indicating image read start timing in terms of the length in the main scanning direction. The image sensor pair 234 in the scanner 130 includes a large number of sensors arranged in the main scanning direction.

Pixel information obtained by the sensors of the image sensor pair 234 is output to the device I/F 116 in succession from the sensors at one end of the image sensor pair 234 to the sensors at the other end. The image sensor pair 234 outputs the pixel information line by line at regular time intervals. By controlling the read timing of the pixel information using the synchronization signal, the CPU 111 can thus start to read pixel information output from the image sensor pair 234 at a pixel in the middle of a line.

The pixel information from consecutive sensors starting at a sensor in the middle of the image sensor pair 234 is transmitted to the CPU 111 via the device I/F 116 after a lapse of a predetermined time (time to read pixels for distance (R)) from the timing waveform 903. Specifically, the CPU 111 receives the read image from the scanner 130 via the device I/F 116 for distance (S) corresponding to distance (A) that is the length of the sheet in the main scanning direction after a time interval of distance (R) from the timing waveform 903. To receive the image for distance (S), the CPU 111 specifies distance (A) that is the length of the sheet in the main scanning direction as the reading size in the main scanning direction in advance, and then instructs the scanner 130 to start reading. When the reading for distance (A) that is the specified reading size in the main scanning direction is completed, the pixel reading on that line is stopped.

By thus controlling the image read timing, an image as much as distance (A) from a left edge 901 of the sheet 900 can be read. In other words, an image having exactly the same size as the document can be read.

By contrast to such normal reading processing, the processing for reading a print position adjustment chart includes image read timing control in consideration of the margins in the main scanning direction.

Figure 10:
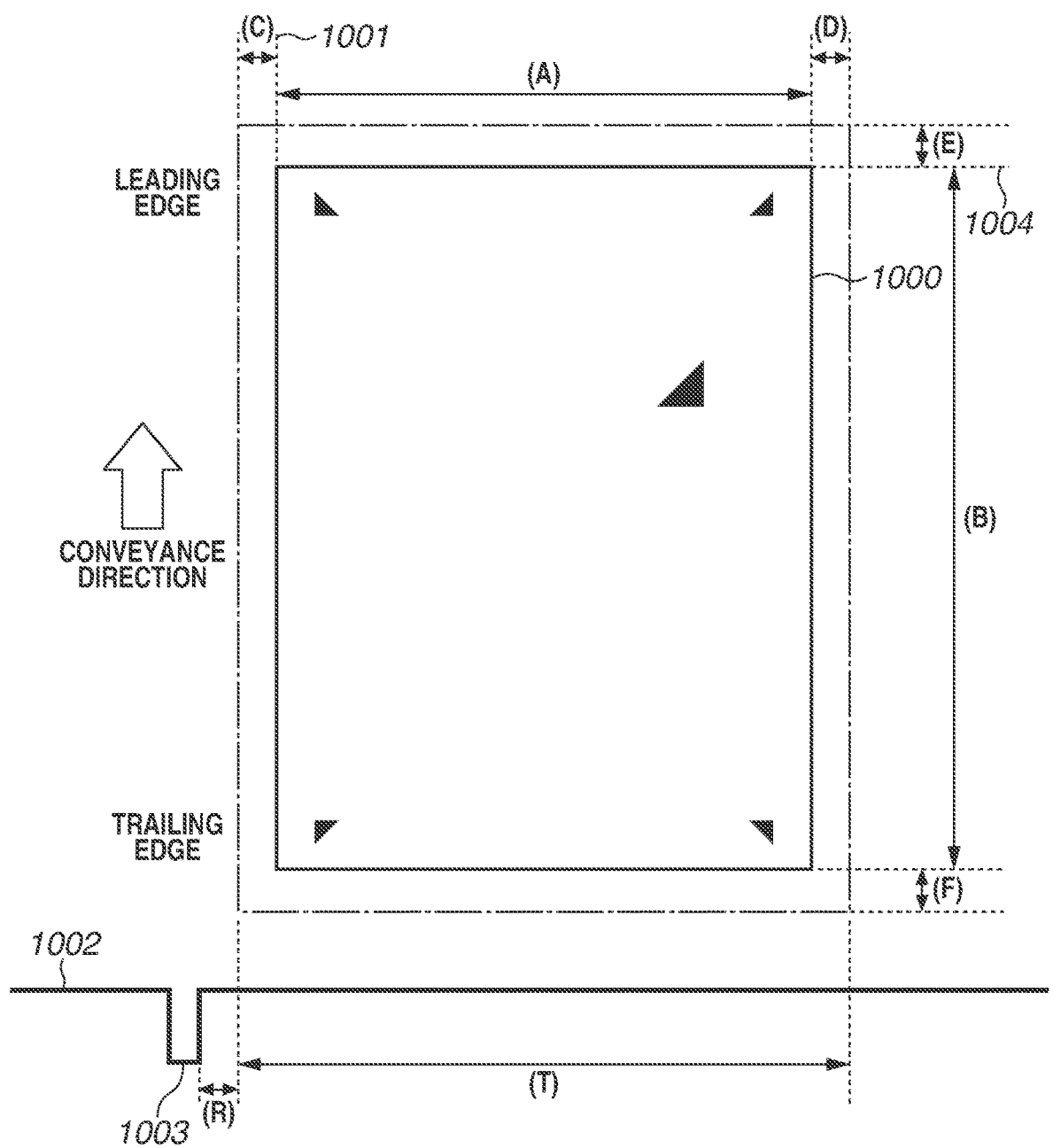
FIG. 10 is a diagram illustrating the reading size of the correction chart in the main scanning direction.

FIG. 10 is a diagram for describing the reading size in the main scanning direction in performing the processing for reading the print position adjustment chart. FIG. 10 schematically illustrates a relationship between the read image and a synchronization signal.

In FIG. 10, a sheet 1000 represents the sheet for the scanner 130 to read. Distances (A) and (B) represent the lengths of the sheet to be read in the main scanning direction and the sub scanning direction, respectively. A synchronization signal 1002 is a synchronization signal used for control where the CPU 111 receives the image read by the scanner 130 via the device I/F 116. A timing waveform 1003 is a synchronization signal indicating image read start timing in terms of the length in the main scanning direction.

Pixel information from consecutive sensors starting at a sensor in the middle of the image sensor pair 234 is transmitted to the CPU 111 via the device I/F 116 after a lapse of a predetermined time (time to read pixels for distance (R)) from the timing of the timing waveform 1003.

Specifically, the CPU 111 receives the read image from the scanner 130 via the device I/F 116 after a time interval of distance (R) from the timing waveform 1003. The read image has a length for distance (T) corresponding to distance (A) that is the length of the sheet in the main scanning direction+distance (C) of the margin area+distance (D) of the margin area. To receive the image for distance (T), the CPU 111 specifies the length in the main scanning direction as the reading size in the main scanning direction in advance, and then instructs the scanner 130 to start reading. The length in the main scanning direction is distance (A)+distance (C) of the margin area+distance (D) of the margin area. When the reading for distance (T) that is the specified reading size in the main scanning direction is completed, the pixel reading on that line is stopped.

By thus adjusting the timing waveform 1003 of the synchronization signal 1002 to control the image read timing, the reading of the image of the margin area of distance (C) at the left edge in the main scanning direction can be started before a left edge 1001 of the print position adjustment chart in the main scanning direction. The pixel at the position corresponding to the left edge 1001 is then read, and the pixels corresponding to the print position adjustment chart are read. After the image for distance (A) in the main scanning direction of the print position adjustment chart is read, the image of the margin area of distance (D) at the trailing edge in the main scanning direction is also read. When the reading of the image for the length of distance (D) from the trailing edge of the print position adjustment chart is completed, the pixel reading on that line is stopped.

As described above with reference to FIGS. 9 and 10, in the processing for reading the print position adjustment chart, the image read timing in the main scanning direction is controlled to come earlier than in the normal reading processing.

<Chart Reading Processing>

Figure 11:
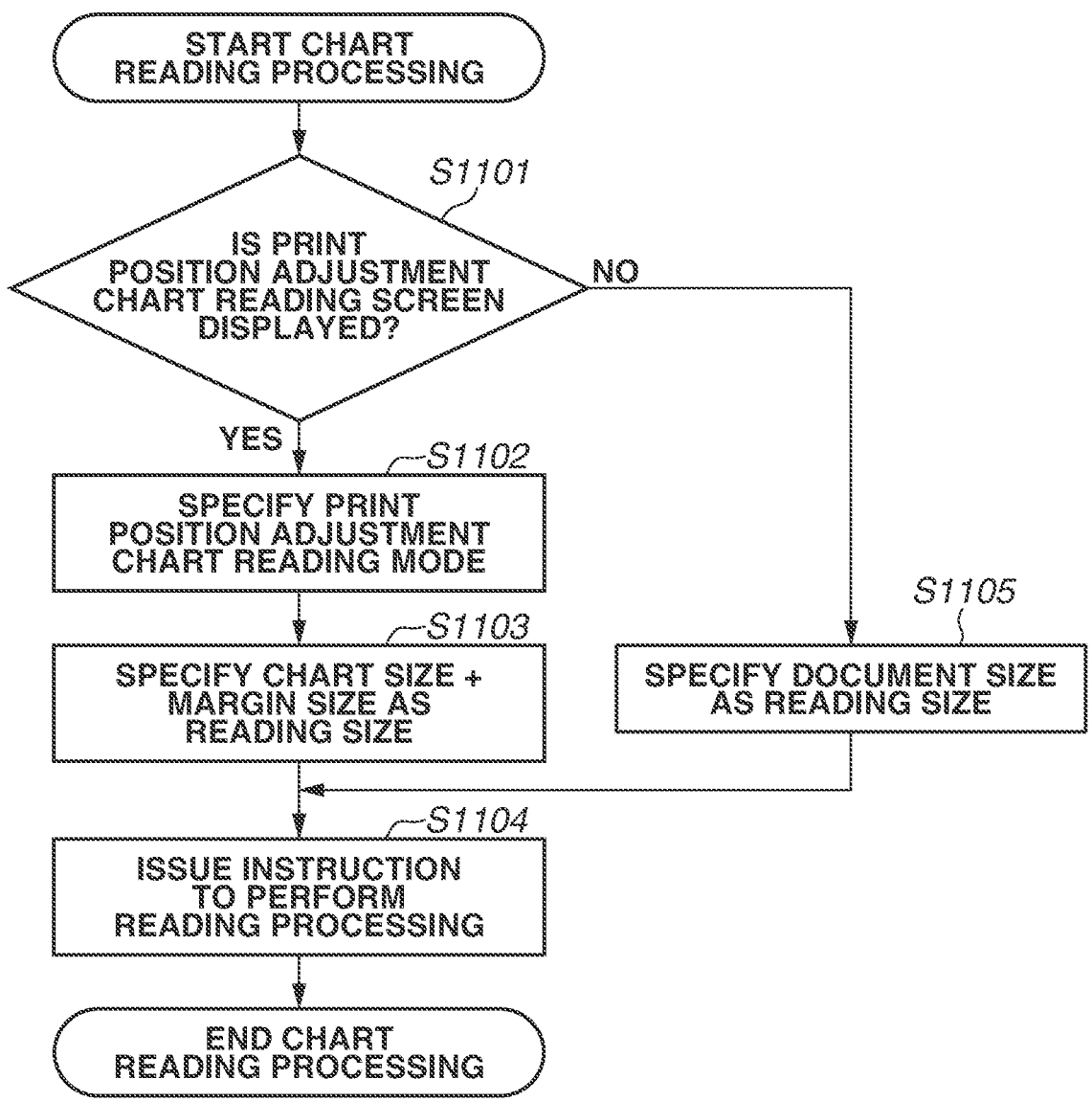
FIG. 11 is a flowchart of chart reading processing.

FIG. 11 illustrates a detailed procedure for the chart reading processing.

The chart reading processing is processing corresponding to operation S502 of FIG. 5. The procedure illustrated in FIG. 11 is implemented by the control unit 110. Specifically, the procedure is implemented by the CPU 111 loading a corresponding program from the ROM 113 or the storage unit 114 into the RAM 112 and executing the loaded program.

In operation S1101, the CPU 111 determines which type of reading screen the screen displayed on the operation unit 150 is. In other words, the CPU 111 determines which type of reading function the function called to be executed is.

If the displayed screen is a print position adjustment chart reading screen (YES in operation S1101), the processing proceeds to operation S1102.

If the displayed screen is not the print position adjustment chart reading screen, for example, the displayed screen is a normal screen corresponding to a function of storing or transmitting a scanned image (NO in operation S1101), the processing proceeds to operation S1105.

In operation S1105, the CPU 111 simply specifies the size information about the read image input by the user or obtained by using the image sensor pair 234 of the placement unit 231 as the reading size and notifies the scanner 130 of the specified reading size without special specifications since the current mode is a normal reading mode.

By contrast, in operation S1102, the CPU 111 specifies a print position adjustment chart read mode and notifies the scanner 130 of the specified mode. The CPU 111 thereby instructs the scanner 130 to perform an image reading operation even on the margins outside the chart area.

In operation S1103, the CPU 111 obtains size information about the read document, specifies a reading size based on (by adding) the obtained size information about the read document and size information about the margin areas including the paper edges of the print position adjustment chart, and notifies the scanner 130 of the specified reading size. The size information about the read document is obtained from sheet information corresponding to the feed cassette specified on the image position adjustment screen 404. The size information about the read document may be input by the user or obtained by using the image sensor pair 234 of the placement unit 231.

In operation S1104, the CPU 111 instructs the scanner 130 to perform reading processing based on the specified mode and reading size.

Note

As described above, according to the present exemplary embodiment, image reading in an image size including the margins is performed in reading a print position adjustment chart using the ADF unit 230. Even if the document conveyed by the ADF unit 230 skews, chart images including the paper edges to be used in obtaining a positional relationship between the marks and the paper edges can thus be appropriately obtained. Since the image size including the margins is smaller than the maximum readable size of the image sensor pair 234, the image reading speed can be increased. While the present exemplary embodiment is described to be applied to print position adjustment, the present exemplary embodiment can be similarly applied to other functions that include the operation of reading a chart using an ADF and making corrections.

In the first exemplary embodiment, an image forming apparatus capable of the processing for reading print position adjustment charts of standard sizes has been described. In a second exemplary embodiment, an image forming apparatus capable of print position adjustment in a long size and a nonstandard size will be described. The image forming apparatus according to the second exemplary embodiment has a configuration similar to that of the first exemplary embodiment except for parts characteristic of the second exemplary embodiment. Similar components are thus denoted by the same reference numerals, and a detailed description thereof will be omitted.

<Image Reading Processing>

Figure 12:
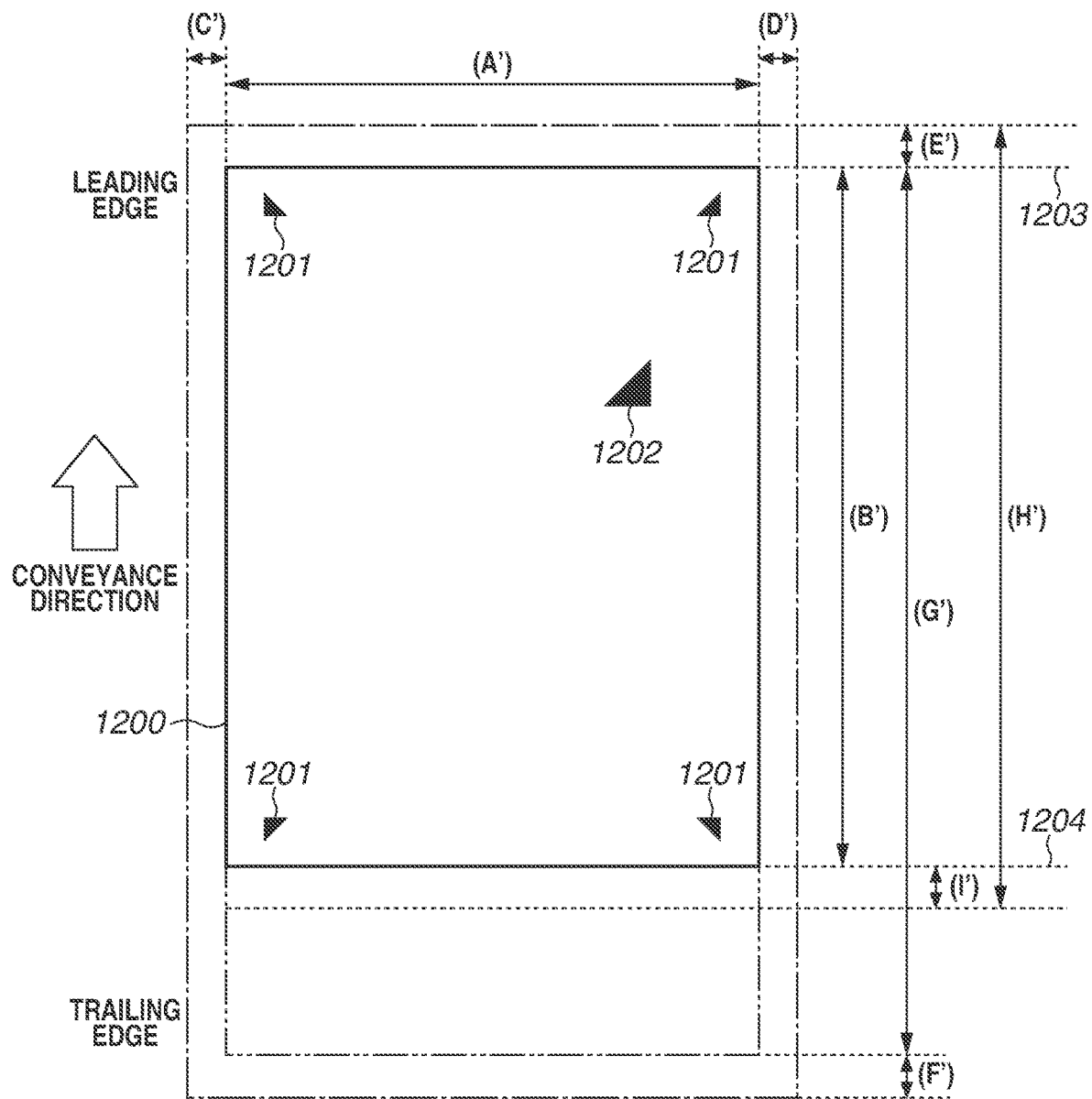
FIG. 12 is a diagram illustrating the reading size of a correction chart of a nonstandard size or a long size.

FIG. 12 is a diagram illustrating the reading size of a correction chart of a nonstandard size or a long size. A chart 1200 illustrated in FIG. 12 is an example of an image position adjustment chart (print position adjustment chart), schematically illustrating a sheet on which image position adjustment marks are printed. The chart 1200 is a sheet of a nonstandard size or a long size on which the marks are printed.

In the present exemplary embodiment, a nonstandard size refers to a sheet size that is not included in the standard sizes and does not exceed a maximum standard size printable by the MFP 100. In the present exemplary embodiment, a long size refers to a sheet size that is not included in the standard sizes and exceeds the maximum standard size printable by the MFP 100. The MFP 100 has a fixed maximum long size readable by the scanner 130. In the present exemplary embodiment, the maximum readable long size is 1000 mm. The present exemplary embodiment will be described on the assumption that the maximum standard size printable by the MFP 100 is A3 size, whereas the maximum printable standard size may be different.

The CPU 111 obtains information to be used in the image position adjustment by analyzing the positions of markers 1201, and determines whether the side is the front or back and determines the placement orientation by detecting an identification patch 1202.

In FIG. 12, distances (A') and (B') are the lengths of the chart in the main scanning direction and the sub scanning direction, respectively. Ideal lengths are sheet lengths defined in the sheet library. Distance (G') represents the length of image reading in the sub scanning direction when the scanner 130 reads the chart of a nonstandard size or a long size. In reading the chart of a nonstandard or long size, the size of the chart is unable to be determined until the scanner 130 actually reads the chart. The scanner 130 thus performs reading by assuming that the length in the sub scanning direction is distance (G') that is the sub scanning length of the maximum long size.

Distances (C') to (F') represent the lengths of the margin areas for the scanner 130 to read an image including the paper edges of the chart.

Distance (C') represents the length of the margin area at the leading edge of the chart in the main scanning direction, and distance (D') the length of the margin area at the trailing edge in the main scanning direction. Distance (E') represents the length of the margin area at the leading edge of the chart in the sub scanning direction, and distance (F') the length of the margin area at the trailing edge in the sub scanning direction.

The margin areas are added to read an image including the paper edges of the chart even if the chart is conveyed askew when the scanner 130 reads the chart using the ADF unit 230. The lengths of distances (C') to (F') of the margin areas are therefore defined based on the conveyance performance of the scanner 130. Distances (C') to (F') all may be the same or different in length.

As described above, in reading a chart of a nonstandard or long size, the scanner 130 performs reading on the assumption that the length in the sub scanning direction is distance (G') that is the sub scanning length of the maximum long size.

To read the image of the print position adjustment chart including the margin areas, the CPU 111 specifies the reading size in the sub scanning direction, notifies the scanner 130 of the specified reading size, and instructs the scanner 130 to perform reading. The reading size in the sub scanning direction is the sum of distance (G') that is the sub scanning length of the maximum long size, distance (E') of the margin area at the leading edge in the sub scanning direction, and distance (F) of the margin area at the trailing edge in the sub scanning direction.

The scanner 130, when instructed to start reading, conveys the chart placed on the ADF unit 230 and starts to read the image of the margin area of distance (E') at the leading edge in the sub scanning direction before a leading edge 1203 of the chart in the sub scanning direction reaches the image sensor pair 234. The scanner 130 then starts to read the chart when the leading edge 1203 reaches the image sensor pair 234. After an image as much as distance (G') that is the sub scanning length of the maximum long size is read, the scanner 130 reads the image of the margin area of distance (F') at the trailing edge in the sub scanning direction. When the reading of the image including the margin areas is completed, the sensor reading is stopped.

In reading the chart of a nonstandard size or long size, the scanner 130 detects the actual distance (B') of the sub scanning length of the chart by detecting the passage of a trailing edge 1204 of the chart through the image sensor pair 234. The scanner 130 notifies the CPU 111 of distance (B') that is the detected actual sub scanning length of the chart. When receiving the image read by the scanner 130 via the device I/F 116, the CPU 111 receives the image for the actual distance (B') of the actual sub scanning length notified from the scanner 130, whereby the reading of the image of a nonstandard size or long size is implemented.

In reading the print position adjustment chart, the CPU 111 receives the read image for distance (H') from the scanner 130 via the device I/F 116.

The CPU 111 receives the read image from the device I/F 116 for distance (H') that is the sum of the notified distance (B') of the actual sub scanning length, distance (E') of the margin area at the leading edge in the sub scanning direction, and distance (F') of the margin area at the trailing edge in the sub scanning direction. The CPU 111 thereby reads the image of the chart of a nonstandard size or long size including the margin areas.

Figure 13:
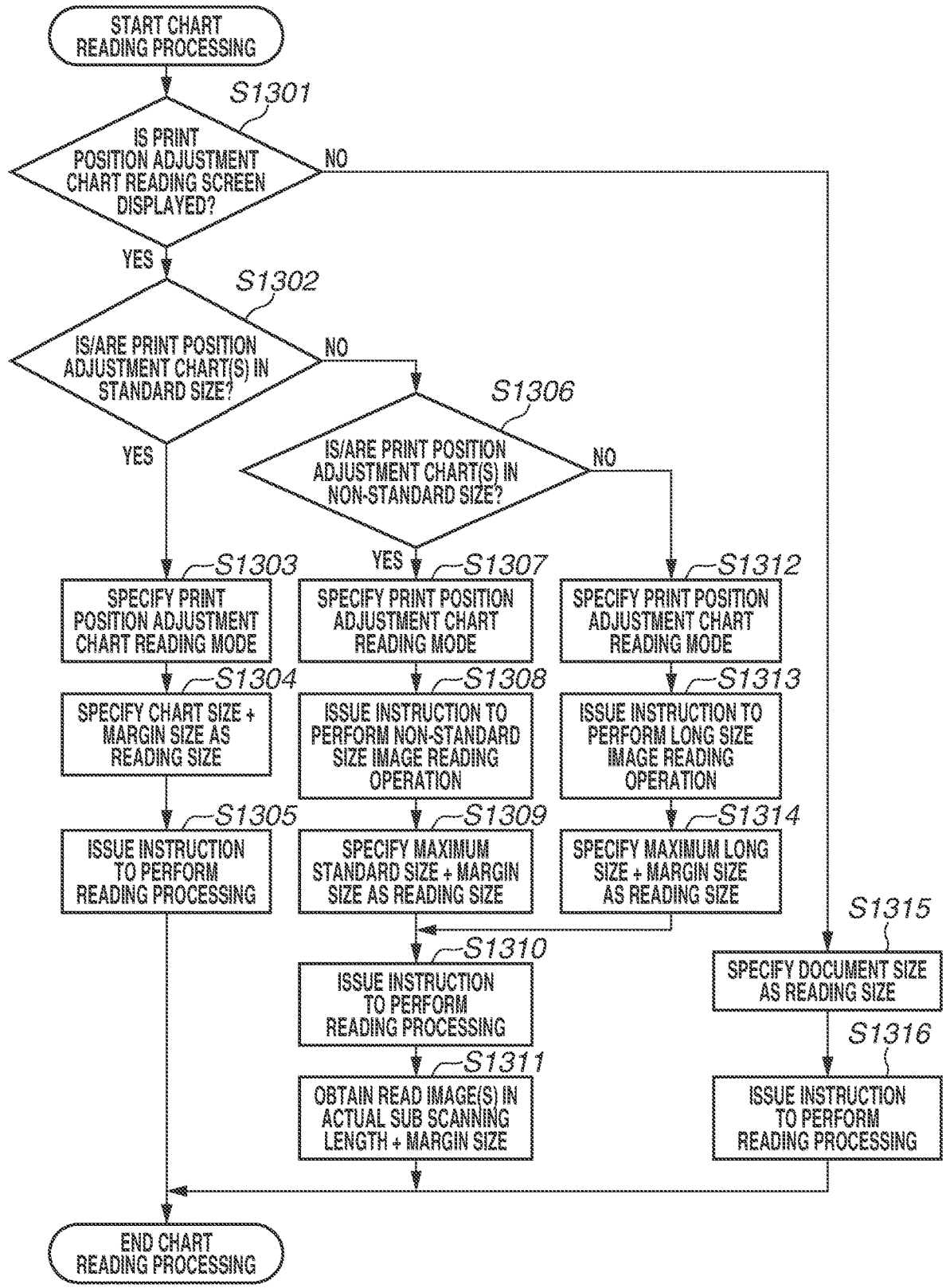
FIG. 13 is a flowchart of reading processing for a nonstandard size and long size.

FIG. 13 is a flowchart of chart reading processing for a nonstandard size and long size.

This chart reading processing is processing corresponding to operation S502 of FIG. 5. The procedure illustrated in FIG. 13 is implemented by the control unit 110. Specifically, the procedure is implemented by the CPU 111 loading a corresponding program from the ROM 113 or the storage unit 114 into the RAM 112 and executing the loaded program.

In operation S1301, the CPU 111 determines which type of reading screen the screen displayed on the operation unit 150 is. In other words, the CPU 111 determines which type of reading function the function called to be executed is.

If the displayed screen is a print position adjustment chart reading screen (YES in operation S1301), the processing proceeds to operation S1302.

If the displayed screen is not the print position adjustment chart reading screen, for example, the displayed screen is a normal screen corresponding to a function of storing or transmitting a scanned image (NO in operation S1301), the processing proceeds to operation S1315.

In operation S1315, the CPU 111 simply specifies size information about the read image input by the user or obtained by using the image sensor pair 234 of the placement unit 231 as reading size and notifies the scanner 130 of the specified reading size without special specifications since the current mode is a normal reading mode.

In operation S1316, the CPU 111 instructs the scanner 130 to perform reading processing based on the specified reading size.

In operation S1302, the CPU 111 determines whether the print position adjustment chart(s) to be read is/are in a standard size. If the print position adjustment chart(s) is/are determined to be in a standard size (YES in operation S1302), the processing proceeds to operation S1303. If the print position adjustment chart(s) is/are determined not to be in a standard size (NO in operation S1302), the processing proceeds to operation S1306.

In operation S1303, the CPU 111 specifies a print position adjustment chart reading mode and notifies the scanner 130 of the specified print position adjustment chart reading mode. The CPU 111 thereby instructs the scanner 130 to perform an image reading operation even on the margins outside the chart area.

In operation S1304, the CPU 111 obtains size information about the read document, specifies a reading size based on (by adding) the obtained size information about the read document and size information about the margin areas including the paper edges of the chart, and notifies the scanner 130 of the specified reading size. The size information about the read document is obtained from sheet information corresponding to the feed cassette specified on the image position adjustment screen 404. The size information about the read document may be input by the user or obtained by using the image sensor pair 234 of the placement unit 231.

In operation S1305, the CPU 111 instructs the scanner 130 to perform reading processing based on the specified mode and reading size.

In operation S1306, the CPU 111 determines which size the print position adjustment chart(s) to be read has/have, a nonstandard size or a long size. If the print position adjustment chart(s) is/are determined to be in a nonstandard size (YES in operation S1306), the processing proceeds to operation S1307.

If the print position adjustment chart(s) is/are determined to not be in a nonstandard size, i.e., to be in a long size (NO in operation S1307), the processing proceeds to operation S1312.

In operation S1307, the CPU 111 specifies the print position adjustment chart reading mode and notifies the scanner 130 of the specified print position adjustment chart reading mode. The CPU 111 thereby instructs the scanner 130 to perform an image reading operation even on the margins outside the chart area.

In operation S1308, the CPU 111 issues an instruction to perform a nonstandard size image reading operation.

In operation S1309, the CPU 111 specifies the sum of the maximum standard size readable by the scanner 130 and the sizes of the margin areas including the paper edges as the reading size, and notifies the scanner 130 of the specified reading size.

In operation S1312, the CPU 111 specifies the print position adjustment chart reading mode and notifies the scanner 130 of the specified print position adjustment chart reading mode. The CPU 111 thereby instructs the scanner 130 to perform an image reading operation even on the margins outside the chart area.

In operation S1313, the CPU 111 issues an instruction to perform a long size image reading operation.

In operation S1314, the CPU 111 specifies the sum of the maximum long size readable by the scanner 130 and the sizes of the margin areas including the paper edges as the reading size, and notifies the scanner 130 of the specified reading size.

In operation S1310, the CPU 111 instructs the scanner 130 to perform reading, and the scanner 130 reads the print position adjustment chart(s).

In operation S1311, the CPU 111 obtains the read image(s) in the size that is the sum of the actual sub scanning length of the print position adjustment chart(s) notified by the scanner 130 and the sizes of the margin areas.

Note

As described above, a chart image or images including the paper edges to be used in obtaining a positional relationship between the marks and the paper edges can be read in reading a print position adjustment chart or charts of a nonstandard size or long size from the ADF unit 230 and performing position image adjustment. While the present exemplary embodiment is described to be applied to print position adjustment, the present exemplary embodiment can be similarly applied to other functions that include reading a chart using an ADF and making corrections.

An exemplary embodiment of the disclosure may be applied to a system including a plurality of devices or an apparatus including a single device. For example, some of the software modules may be configured to be run on an external server, and the functions may be implemented by obtaining the results of processing by the external server. For example, the storage unit for storing data may be included in the external server.

While the exemplary embodiments have been described to be applied to image position adjustment, the exemplary embodiments can be similarly applied to other functions that include reading a chart using an ADF and making corrections.

The disclosure is not limited to the foregoing exemplary embodiments. Various modifications (including organic combinations of the exemplary embodiments) can be made based on the gist of the disclosure, and such modifications are not excluded from the scope of the disclosure. In other words, all configurations combining the foregoing exemplary embodiments and the modifications thereof are also included in the disclosure.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or a non-transitory storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-041326, filed Mar. 16, 2022, which is hereby incorporated by reference herein in its entirety.

What is claimed is:

1. An image forming apparatus comprising:
an image forming unit configured to form an image on a sheet;
a conveying unit configured to convey the sheet on a conveyance path in a conveyance direction;
a reading unit including at least one image sensor positioned along the conveyance path, the reading unit configured to read the sheet when the sheet reaches the at least one image sensor while the sheet is conveyed in the conveyance direction by the conveying unit;
one or more processors; and
at least one memory storing executable instructions, which when executed by the one or more processors, cause the image forming apparatus to perform operations comprising:
cause the image forming unit to perform image formation processing for forming an image of a predetermined pattern on a sheet;
cause the conveying unit to convey, in the conveyance direction, the sheet on which the image of the predetermined pattern is formed;
cause, based on a size of the sheet on which the image of the predetermined pattern is formed, the reading unit to start performing image reading before a leading edge of the sheet on which the image of the predetermined pattern is formed conveyed by the conveying unit in the conveyance direction reaches the least one image sensor, such that the reading unit reads the sheet conveyed by the conveying unit in an image size greater than the size of the sheet on which the image of the predetermined pattern is formed; and
obtain an adjustment value for use in image formation processing based on a result of the image reading.

2. The image forming apparatus according to claim 1, wherein the sheet on which the image of the predetermined pattern is formed is a sheet of a standard size.

3. The image forming apparatus according to claim 1, wherein the sheet on which the image of the predetermined pattern is formed is a sheet of a nonstandard size.

4. The image forming apparatus according to claim 1, wherein the sheet on which the image of the predetermined pattern is formed is a sheet of a long size.

5. The image forming apparatus according to claim 1, wherein the instructions, when executed by the one or more processors, cause the image forming apparatus to cause the reading unit to, in a case where the sheet on which the image of the predetermined pattern is formed is read, make a time interval from conveyance of the sheet and the reading of the image shorter than normal.

6. The image forming apparatus according to claim 1, wherein the image of the predetermined pattern includes markers near respective four corners of the sheet.

7. The image forming apparatus according to claim 6, wherein the markers are triangles.

8. The image forming apparatus according to claim 7, wherein the markers are isosceles triangles.

9. The image forming apparatus according to claim 1,
wherein the predetermined pattern includes an identification patch, and
wherein the identification patch is a patch for identifying a front and back of the sheet.

10. The image forming apparatus according to claim 1,
wherein the predetermined pattern includes an identification patch, and
wherein the identification patch is a patch for identifying an orientation of the sheet.

11. The image forming apparatus according to claim 1, further comprising:
a display unit configured to display information,
wherein the instructions, when executed by the one or more processors, cause the image forming apparatus to cause the display unit to display a screen, the screen being configured to prompt placement of the sheet on which the image of the predetermined pattern is formed on the reading unit.

12. The image forming apparatus according to claim 11, wherein the screen includes information about a placement orientation of the sheet on which the image of the predetermined pattern is formed.

13. A control method of an image forming apparatus including an image forming unit configured to form an image on a sheet, a conveying unit configured to convey the sheet on a conveyance path in a conveyance direction, and a reading unit including at least one image sensor positioned along the conveyance path, the reading unit configured to read the sheet when the sheet reaches the at least one image sensor while the sheet is conveyed in the conveyance direction by the conveying unit, the control method comprising:

causing the image forming unit to perform image formation processing for forming an image of a predetermined pattern on a sheet;

causing the conveying unit to convey, in the conveyance direction, the sheet on which the image of the predetermined pattern is formed;

causing, based on a size of the sheet on which the image of the predetermined pattern is formed, the reading unit to start performing image reading before a leading edge of the sheet on which the image of the predetermined pattern is formed conveyed by the conveying unit in the conveyance direction reaches the least one image sensor, such that the reading unit reads the sheet conveyed by the conveying unit in an image size greater than the size of the sheet on which the image of the predetermined pattern is formed; and obtaining an adjustment value for use in image formation processing based on a result of the image reading.

14. A non-transitory computer-readable storage medium storing a program for causing a computer to perform a control method of an image forming apparatus including an image forming unit configured to form an image on a sheet, a conveying unit configured to convey the sheet on a conveyance path in a conveyance direction, and a reading unit including at least one image sensor positioned along the conveyance path, the reading unit configured to read the sheet when the sheet reaches the at least one image sensor while the sheet is conveyed in the conveyance direction by the conveying unit, the control method comprising:

causing the image forming unit to perform image formation processing for forming an image of a predetermined pattern on a sheet;

causing the conveying unit to convey, in the conveyance direction, the sheet on which the image of the predetermined pattern is formed;

causing, based on a size of the sheet on which the image of the predetermined pattern is formed, the reading unit to start performing image reading before a leading edge of the sheet on which the image of the predetermined pattern is formed conveyed by the conveying unit in the conveyance direction reaches the least one image sensor, such that the reading unit reads the sheet conveyed by the conveying unit in an image size greater than the size of the sheet on which the image of the predetermined pattern is formed; and obtaining an adjustment value for use in image formation processing based on a result of the image reading.

* * * * *